United States Patent
Savaglio et al.

(10) Patent No.: US 10,676,621 B2
(45) Date of Patent: Jun. 9, 2020

(54) MULTI-PURPOSE FLOOR FINISH COMPOSITION

(71) Applicant: S.C. Johnson & Son, Inc., Racine, WI (US)

(72) Inventors: Carmine Savaglio, Kenosha, WI (US); Russell O. Carlsen, Racine, WI (US); Teresa L. Cook, Evanston, IL (US)

(73) Assignee: S. C. Johnson & Son, Inc., Racine, WI (US)

( * ) Notice: Subject to any disclaimer, the term of this patent is extended or adjusted under 35 U.S.C. 154(b) by 89 days.

(21) Appl. No.: 15/449,392

(22) Filed: Mar. 3, 2017

(65) Prior Publication Data

US 2017/0253748 A1    Sep. 7, 2017

Related U.S. Application Data

(60) Provisional application No. 62/304,002, filed on Mar. 4, 2016.

(51) Int. Cl.

| | | |
|---|---|---|
| *C09D 5/00* | (2006.01) | |
| *C09D 7/20* | (2018.01) | |
| *C09D 7/63* | (2018.01) | |
| *C09D 5/02* | (2006.01) | |
| *C09G 1/10* | (2006.01) | |
| *C09D 133/04* | (2006.01) | |
| *C09D 125/08* | (2006.01) | |
| *C08K 5/103* | (2006.01) | |
| *C08K 5/10* | (2006.01) | |
| *C08K 5/06* | (2006.01) | |
| *E04F 15/12* | (2006.01) | |

(52) U.S. Cl.
CPC .............. *C09D 5/00* (2013.01); *C09D 5/02* (2013.01); *C09D 5/024* (2013.01); *C09D 7/20* (2018.01); *C09D 7/63* (2018.01); *C09D 125/08* (2013.01); *C09D 133/04* (2013.01); *C09G 1/10* (2013.01); *C08K 5/06* (2013.01); *C08K 5/10* (2013.01); *C08K 5/103* (2013.01); *E04F 15/12* (2013.01)

(58) Field of Classification Search
CPC .......... C09D 7/20; C09D 7/65; C09D 125/14; C09D 133/02; C09D 133/04
See application file for complete search history.

(56) References Cited

U.S. PATENT DOCUMENTS

| | | | |
|---|---|---|---|
| 4,317,755 A * | 3/1982 | Gregory | ................... C09G 1/16 106/10 |
| 4,749,508 A | 6/1988 | Cockrell, Jr. et al. | |
| 5,356,968 A | 10/1994 | Rupaner et al. | |
| 5,462,690 A | 10/1995 | Rhinesmith | |
| 5,532,291 A | 7/1996 | Wright et al. | |
| 5,676,741 A * | 10/1997 | Gray | ..................... C08F 220/04 106/3 |
| 5,760,113 A | 6/1998 | Mitsutake et al. | |
| 5,977,228 A | 11/1999 | Mauer | |
| 6,017,163 A | 1/2000 | Keppers et al. | |
| 6,019,855 A | 2/2000 | Finch et al. | |
| 6,361,826 B2 | 3/2002 | Olson et al. | |
| 6,384,010 B1 | 5/2002 | Wagers | |
| 6,391,226 B1 | 5/2002 | Chauvette et al. | |
| 6,403,546 B1 | 6/2002 | Hernandez et al. | |
| 6,410,634 B2 | 6/2002 | Rufus et al. | |
| 6,460,548 B1 | 10/2002 | Gordon et al. | |
| 6,530,383 B1 | 3/2003 | Rogmann et al. | |
| 6,548,596 B1 | 4/2003 | Kohr et al. | |
| 6,664,329 B2 | 12/2003 | Gwin et al. | |
| 6,689,830 B1 | 2/2004 | Arendt et al. | |
| 6,696,399 B1 | 2/2004 | Chernin et al. | |
| 6,716,804 B2 | 4/2004 | Scherubel | |
| 6,822,030 B2 | 11/2004 | Olson et al. | |
| 7,326,674 B2 | 2/2008 | Sheirs et al. | |
| 7,494,963 B2 | 2/2009 | Ahmed et al. | |
| 7,501,027 B2 | 3/2009 | Ahmed et al. | |
| 7,530,361 B2 | 5/2009 | Killeen et al. | |
| 7,578,888 B2 | 8/2009 | Schildmann | |
| 7,741,265 B2 | 6/2010 | Iverson et al. | |
| 7,825,178 B2 | 11/2010 | Nagata et al. | |
| 7,838,484 B2 | 11/2010 | Underwood et al. | |
| 7,838,485 B2 | 11/2010 | Heisig et al. | |
| 7,872,063 B2 | 1/2011 | Strepka et al. | |
| 7,964,547 B2 | 6/2011 | Underwood et al. | |
| 8,088,724 B2 | 1/2012 | Iverson et al. | |
| 8,114,827 B2 | 2/2012 | Shamayeli et al. | |
| 8,124,225 B2 | 2/2012 | Kim et al. | |
| 8,216,678 B2 | 7/2012 | Woronuk et al. | |
| 8,299,151 B1 | 10/2012 | Hills et al. | |

(Continued)

FOREIGN PATENT DOCUMENTS

DE    202013001148 U1    5/2014
EP    0120712 A2    10/1984

(Continued)

OTHER PUBLICATIONS

Dow Oxygenated Solvents Product Overview and Selection Guide (2018) (Year: 2018).*
Dow Glycol Ether & Solvents Selection Guide (2019) (Year: 2019).*
International Search Report and Written Opinion, International Application No. PCT/US2017/020686, dated Sep. 26, 2017, 17 pages.
Safety Data Sheet—ISHINE, Spartan Chemical Company, Inc., Jul. 31, 2015, 5 pages.
Tergitol 15-S Series Surfactants Structure, Dow Answer Center, Apr. 11, 2016, 1 page.

*Primary Examiner* — Robert C Boyle

(57) ABSTRACT

A composition for a multi-purpose floor finish is disclosed that includes at least one polymer, at least one plasticizer, and at least one hydrophobic glycol solvent. Further, the composition for a multi-purpose floor finish comprises a percent elongation of at least 100% and a tensile strength of at least 1000 psi.

17 Claims, 1 Drawing Sheet

(56) References Cited

U.S. PATENT DOCUMENTS

| | | |
|---|---|---|
| 8,329,630 B2 | 12/2012 | Finison et al. |
| 8,394,751 B2 | 3/2013 | Hawes, III et al. |
| 8,420,586 B2 | 4/2013 | Vinson et al. |
| 8,436,059 B2 | 5/2013 | Kim et al. |
| 8,440,751 B2 | 5/2013 | Kohnke et al. |
| 8,519,036 B2 | 8/2013 | Hills et al. |
| 8,680,185 B2 | 3/2014 | Hills et al. |
| 8,778,862 B2 | 7/2014 | Hernandez et al. |
| 8,785,366 B2 | 7/2014 | Mondin et al. |
| 8,895,491 B2 | 11/2014 | Vinson et al. |
| 8,933,009 B2 | 1/2015 | Schacht et al. |
| 8,940,826 B2 | 1/2015 | Gaston |
| 8,943,605 B1 | 1/2015 | Martin et al. |
| 8,962,738 B2 | 2/2015 | Smith et al. |
| 8,980,818 B2 | 3/2015 | Wates et al. |
| 9,029,309 B2 | 5/2015 | Hanson et al. |
| 9,127,239 B2 | 9/2015 | Gamer |
| 9,226,641 B2 | 1/2016 | Woo et al. |
| 9,243,213 B1 | 1/2016 | Vetter et al. |
| 9,295,865 B2 | 3/2016 | Willey et al. |
| 9,309,485 B2 | 4/2016 | Hunt, Jr. et al. |
| 9,365,803 B2 | 6/2016 | Vetter et al. |
| 9,428,718 B2 | 8/2016 | Hensley |
| 9,512,384 B2 | 12/2016 | Hanson et al. |
| 9,528,077 B2 | 12/2016 | Man et al. |
| 2003/0088045 A1* | 5/2003 | Haberle ............ C04B 24/282 528/44 |
| 2005/0065055 A1 | 3/2005 | Barnes |
| 2005/0154109 A1 | 7/2005 | Li et al. |
| 2005/0215678 A1* | 9/2005 | Ludtke ............... C09D 7/63 524/127 |
| 2007/0129278 A1 | 6/2007 | Christmas |
| 2008/0015133 A1 | 1/2008 | Rigley et al. |
| 2008/0023031 A1 | 1/2008 | Kellar et al. |
| 2008/0293612 A1 | 11/2008 | Kellar et al. |
| 2008/0299405 A1 | 12/2008 | Wang et al. |
| 2011/0180100 A1 | 7/2011 | Hafer et al. |
| 2012/0252958 A1 | 10/2012 | Yagi et al. |
| 2013/0052467 A1* | 2/2013 | Smith ............... C08K 5/52 428/446 |
| 2015/0005222 A1 | 1/2015 | Hunt, Jr. et al. |
| 2015/0121790 A1 | 5/2015 | Smith et al. |
| 2015/0190844 A1* | 7/2015 | Boulanger ........ C09D 133/08 427/299 |
| 2015/0210958 A1 | 7/2015 | Hanson et al. |
| 2015/0361381 A1 | 12/2015 | Ebert et al. |
| 2016/0130527 A9 | 5/2016 | Sehgal et al. |
| 2016/0237379 A1 | 8/2016 | Chow et al. |
| 2016/0312155 A1 | 10/2016 | Sutton, Jr. et al. |
| 2016/0326470 A1 | 11/2016 | Hensley |

FOREIGN PATENT DOCUMENTS

| | | |
|---|---|---|
| EP | 0696625 A2 | 2/1996 |
| EP | 1584708 A2 | 10/2005 |
| EP | 2262883 A2 | 12/2010 |
| EP | 2588437 A1 | 5/2013 |
| EP | 2954036 A1 | 12/2015 |
| EP | 2961819 A2 | 1/2016 |
| EP | 2969150 A1 | 1/2016 |
| GB | 1254294 A | 11/1971 |
| GB | 2341870 A | 3/2000 |
| WO | WO9618711 A1 | 6/1996 |
| WO | WO9919449 A1 | 4/1999 |
| WO | WO0064597 A1 | 11/2000 |
| WO | WO0129140 A1 | 4/2001 |
| WO | WO2006131689 A1 | 12/2006 |
| WO | WO2009117299 A2 | 9/2009 |
| WO | WO2009156254 A1 | 12/2009 |
| WO | WO2012005897 A1 | 1/2012 |
| WO | WO2012162641 A2 | 11/2012 |
| WO | WO2013122934 A1 | 8/2013 |
| WO | WO2014121406 A1 | 8/2014 |
| WO | WO2014131584 A2 | 9/2014 |
| WO | WO2014164024 A1 | 10/2014 |
| WO | WO2014209576 A1 | 12/2014 |
| WO | WO2016018898 A1 | 2/2016 |
| WO | WO2016018900 A1 | 2/2016 |
| WO | WO2016055264 A1 | 4/2016 |
| WO | WO2016172024 A1 | 10/2016 |

* cited by examiner

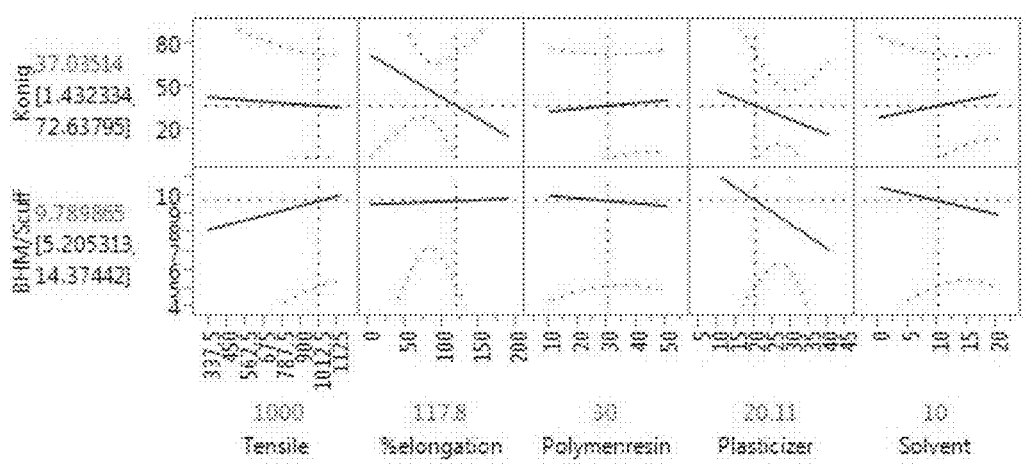

MULTI-PURPOSE FLOOR FINISH COMPOSITION

CROSS REFERENCE TO RELATED APPLICATIONS

This patent application claims priority under 35 U.S.C. § 119 to U.S. Provisional Patent Application 62/304,002, filed on Mar. 4, 2016, the entire contents of which is hereby incorporated by reference, for any and all purposes.

FIELD OF THE INVENTION

This invention relates to coating compositions useful as both a floor finish and a floor sealer. The multi-purpose composition, as disclosed herein, comprises a unique polymer, plasticizer, and solvent formulation to achieve the desired properties of both a floor finish and a floor sealer.

BACKGROUND OF THE INVENTION

In general, there are many compositions commercially available for use in finishing and sealing floors. Floor sealers are designed for multiple substrates and are generally soft and flexible formulations, but have poor scratch and/or scuff resistance. Alternatively, floor finishes are designed to yield a high gloss after initial application and exceptional scratch and/or scuff resistance, yet are brittle and lack flexibility, and are therefore unsuitable as a floor sealer. Further, floor finishes may inconsistently and often lose adhesion to certain substrates, including, for example, rubber, terrazzo, and vinyl. Therefore, one would be typically forced to use a floor finish product and a separate floor sealer product to achieve the aforementioned properties of both a floor finish and a floor sealer.

Various components such as polyurethanes, epoxy coatings, styrene/acrylic sealers, and styrene acrylic finishes may be used to achieve the desired properties for separate floor finishes and floor sealers. In particular, traditional floor finishes may include styrene/acrylic polymers with zinc crosslinkers which are generally brittle with a high tensile strength and a low percent elongation. This is the general nature of styrene/acrylic polymers having zinc crosslinkers. In general, the greater the degree of crosslinking, i.e., zinc level, corresponds to a more brittle floor finish. Further, the degree of crosslinking is not the only factor that may control the brittleness of a floor finish. Other factors may include an improper concentration of plasticizers or other modifiers and/or the polymer design and composition.

Typical conventional products fail to provide a composition, and in particular a composition that includes an acrylic composition, that truly combines a floor finish and a floor sealer into a single product. As discussed, currently available compositions are either floor finishes or floor sealers, and require two separate applications. Thus, a single composition for use during a single application that functions as both a floor finish and a floor sealer is desired in order to drastically reduce the labor and time required to finish and seal a floor surface.

SUMMARY

The subject matter described herein relates to compositions and methods for finishing and sealing floors. The compositions include multi-purpose floor finishing products that both finish and seal floors in a single application.

Accordingly, an advantage of the present disclosure is to provide a multi-purpose floor finish composition that can be used as both a floor finish and a floor sealer. Another advantage of the present disclosure is to provide a plurality of multi-purpose floor finish compositions with extraordinary floor-protecting capabilities, e.g., ≥ about 100% elongation, ≥ about 1000 psi tensile strength.

In one embodiment, the composition comprises an at least one polymer, an at least one plasticizer, and an at least one hydrophobic glycol solvent. In some embodiments, the polymer is an acrylic polymer emulsion. Further, the acrylic polymer emulsion may have an average particle size of less than about 150 nanometers and comprises a solids content in an amount ranging from about 11% to about 16%. In some embodiments, the acrylic polymer emulsion further comprises styrene. In the preferred embodiment, the composition comprises the polymer in an amount ranging from about 30% to about 40% based on a total weight of the composition. Additionally, in the preferred embodiments, the composition comprises a second polymer emulsion. In this embodiment, the second polymer is an alkali soluble polymer and/or resin solution.

The composition may further include an at least one plasticizer. In some embodiments, the at least one plasticizer includes a benzoate ester plasticizer. Further, the benzoate plasticizer may have a formula $PhCO(O)R_1$, where Ph represents a phenyl radical and $R_1$ represents a linear or branched hydrocarbon radical having six or less carbon atoms. In some embodiments, the benzoate ester plasticizer may comprise monobenzoates including diethylene glycol monobenzoate, triethylene glycol monobenzoate, dipropylene glycol monobenzoate, and a combination of any two or more thereof. In some embodiments, the benzoate ester plasticizer comprises less than about 5% of a diethylene glycol monobenzoate based on the total weight of the benzoate ester plasticizer. In some embodiments, the at least one plasticizer is in an amount of about 1% to about 3% based on a total weight of the composition. Additionally, in preferred embodiments, the composition may further comprise a second plasticizer. In these particular embodiments, the second plasticizer is a tributoxy ethyl phosphate and is present in an amount of about 1% to about 3% based on a total weight of the composition.

The composition may further include an at least one solvent and, in the preferred embodiment, an at least one hydrophobic glycol solvent. In the preferred embodiment, the hydrophobic glycol solvent may be selected from an ethylene glycol phenyl ether, an ethylene glycol N-hexyl ether, and/or a combination of any two or more thereof. In some embodiments, the at least one solvent and/or glycol solvent is in an amount of about 5% to about 8% based on a total weight of the composition. In the preferred embodiments, the composition comprises two or three hydrophobic solvents.

The composition may further comprise water, an at least one surfactant, an at least one wax or wax emulsion, an additional solvent, an at least one fragrance, an at least one antifoaming agent, an additional additive, and/or combinations thereof.

In the preferred embodiments, the compositions produce formulations that have a percent elongation of at least about 100% and a tensile strength of at least about 1000 psi. Further, the compositions have a solids content of approximately 15% to about 25%. As such, the composition may provide a multi-purpose floor finish product with the strength of commercially known floor finishes, yet still provide the flexibility of commercially known floor sealers.

Further, the disclosure may provide a method of finishing and sealing floors which comprises applying the present compositions to a floor surface.

BRIEF DESCRIPTION OF THE DRAWINGS

FIG. 1 illustrates a graph demonstrating a relationship between a Konig hardness value (Konig) or a Black Heel/Scuff rating (BHM/Scuff) and a tensile strength (Tensile), a percent elongation (% elongation), a ratio of polymer to resin (Polymer:resin), a plasticizer on polymer percentage (Plasticizer), and a hydrophobic solvent on polymer percentage (Solvent) of multi-purpose floor finish compositions according to an embodiment of the disclosure.

Other aspects and advantages of embodiments of the disclosure will become apparent upon consideration of the following detailed description, wherein similar structures have like or similar reference numerals.

DETAILED DESCRIPTION

Before any embodiments of the invention are explained in detail, it is to be understood that the invention is not limited in its application to the details of construction and the arrangement of components set forth in the following description or illustrated in the following drawings and/or examples. The invention is capable of other embodiments and of being practiced or of being carried out in various ways.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures. The figures, which are not necessarily to scale, depict selected embodiments and are not intended to limit the scope of embodiments of the invention. Skilled artisans may also recognize that the examples provided herein have many useful alternatives and fall within the scope of embodiments of the invention.

The present disclosure is directed toward a multi-purpose floor finish composition and methods thereof. While the present disclosure may be embodied in many different forms, several specific embodiments are discussed herein with the understanding that the present disclosure is to be considered only as an exemplification of the principles of the disclosure, and it is not intended to limit the disclosure to the embodiments illustrated.

The term "about," as used herein, refers to variation in the numerical quantity that may occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" may also encompass amounts that differ due to different equilibrium conditions for a composition resulting from a particular initial mixture. In one embodiment, the term "about" refers to a range of values±5% of a specified value.

The term "ready-to-use," as used herein, refers to compositions which are meant to be used as-is without dilution. Further, the term "ready-to-use," may also refer to a dilution of a concentrate.

The term "weight percent," "wt-%," "percent by weight," "% by weight," and variations thereof, as used herein, refer to the concentration of a substance as the weight of that substance divided by the total weight, for example, of the composition or of a particular component of the composition, and multiplied by 100. It is understood that, as used herein, "percent," "%," and the like may be synonymous with "weight percent," "wt-%."

The compositions described herein include water. The term "water" may include, without limitation, deionized (DI) or any other water suitable for the composition.

The term "hydrophobic glycol solvent," as used herein, refers to any glycol ether solvent that has a solubility in water of about 0.1 to about 20% by weight at 25° C., 1 atm and an evaporation rate of about 1 mm Hg or less or, more preferably, with an evaporation rate of about 0.1 mm Hg or less.

In one embodiment, the composition includes an at least one polymer or polymer emulsion, an at least one plasticizer, and an at least one hydrophobic glycol solvent.

Polymer/Polymer Emulsion

In short, and as known in the art, polymer or polymer emulsions may provide a desired flexibility to a composition applied therein. Further, if a polymer is provided as a resin solution, the polymer may alternatively provide a desired strength to the composition applied thereto.

In one embodiment, the at least one polymer is in an amount of about 20% to about 60%, or more specifically about 25% to about 50%, or even more specifically about 30% to about 40% based on a total weight of the composition.

Further, the polymer has a solids content in an amount of about 10% to about 40%, or more specifically about 10% to about 30%, or even more specifically about 11% to about 16% based on a total weight of the polymer.

In a preferred embodiment, the polymer may be an acrylic polymer emulsion. Suitable acrylic polymers may include, but are not limited to polymers, copolymers, or terpolymers of acrylic acid or methacrylic acid with esters of acrylic or methacrylic acid, hydroxyethyl methacrylate methacrylonitrile, and acrylonitrile. Additional monomers may also be used. For example, additional monomers may include methyl methacrylate, butyl acrylate, ethyl acrylate, and 2-ethylhexyl acrylate. Further, additional unsaturated acid monomers may be substituted in part for the methacrylic acid. Suitable unsaturated acid monomers may include, but are not limited to, maleic acid, crotonic acid, fumaric acid, and itaconic acid.

The polymer may also comprise a vinyl component. The vinyl component may be a styrene or a monoalkenyl aromatic monomer such as methyl styrene or tertiary butyl styrene. In a specific embodiment, the acrylic polymer emulsion comprises a styrene.

As mentioned, the polymer emulsion may also be provided as a copolymer. Suitable copolymers include, but are not limited to, styrene/butyl acrylate/methacrylic acid, styrene/ethyl acrylate/methacrylic acid, styrene/butyl acrylate/ethyl acrylate acid, and styrene/butyl acrylate acrylate/ethyl methacrylic acid.

Other suitable polymers include, but are not limited to, styrene/butyl acrylate/acrylate/acrylic acid, styrene/ethyl acrylate/acrylic acid, and methyl/styrene styrene/butyl acrylate/ethyl acrylate/methacrylic acid/acrylic acid.

In another embodiment, the polymer is acid functional and is provided as a zinc cross-linked styrene-acrylic copolymer emulsion. Examples of commercially available polymers that may find use herein include for example, DURAPLUS™ 3, DURAPLUS™ 3LO, and RHOPLEX™ E-3392 or RHOPLEX™ 1531 from The Dow Chemical Company, Mor-Glo 8 from OMNOVA Solutions, or Joncryl® 8615 from BASF Corporation.

In a further embodiment, the acrylic polymer emulsion has an average particle size of about 1 nm to about 10 μm or, more specifically about 10 nm to about 500 nm, or even more specifically about 50 nm to about 150 nm. In a particular embodiment, the acrylic polymer emulsion has an average particle size of less than about 150 nanometers.

Plasticizer

In general, plasticizers may increase the plasticity or fluidity of a material. As a result, a relatively high level of plasticizer may result in a soft and weak film or coating. Alternatively, a relatively low level of plasticizer may create a brittle coating. Therefore, in light of the experimentation disclosed herein, the plasticizers may be preferably incorporated in the multi-purpose compositions in amounts ranging from about 0.5% to about 5%, or more specifically about 0.7% to about 4%, or even more specifically about 1% to about 3% based on a total weight of the composition.

Particularly preferred plasticizers for use herein are benzoate esters and/or a tributoxy ethyl phosphate. Other suitable plasticizers may also include glycol ether dibenzoates based on ethylene or propylene glycols including, but not limited to, propylene glycol dibenzoate, dipropylene glycol dibenzoate, polypropylene glycol dibenzoate, ethylene glycol dibenzoate, diethylene glycol dibenzoate, polyethylene glycol dibenzoate, neopentyl glycol dibenzoate, and the like, as well as isodecyl benzoate, dipropylene glycol monomethyl ether benzoate, 2,2,4-trimethyl-1,3-pentanediol diisobutyrate and combinations thereof.

In one embodiment the at least one plasticizer comprises a benzoate ester plasticizer. In a particular embodiment, the benzoate ester plasticizer has a formula $PhCO(O)R_1$, where Ph represents a phenyl radical and $R_1$ represents a linear or branched hydrocarbon radical comprising six or less carbon atoms.

In one embodiment, the benzoate ester plasticizer is a diethylene glycol dibenzoate. For example, the benzoate ester plasticizer may be Benzoflex™ 2088, from the Eastman Chemical Company.

Suitable benzoate ester plasticizers may further include a monobenzoate. The monobenzoate may be present in the composition when the monobenzoate is not completely converted to dibenzoate. In particular, monobenzoates may include, but are not limited to, diethylene glycol monobenzoate, triethylene glycol monobenzoate, dipropylene glycol monobenzoate, and/or a combination of any two or more thereof. In one embodiment, the benzoate ester plasticizer comprises less than about 5% of a diethylene glycol monobenzoate based on a total weight of the benzoate ester plasticizer.

As mentioned, in one embodiment, Benzoflex™ 2088 may be used. Benzoflex™ 2088 may not contain 2-ethylhexyl benzoate (C8). It may also contain low levels, i.e., six carbons or less, of other monobenzoates; specifically, diethylene glycol monobenzoate, triethylene glycol monobenzoate, and dipropylene glycol monobenzoate.

Solvents and Hydrophobic Solvents

The composition further comprises an at least one solvent. In the preferred embodiment, the at least one solvent comprises a glycol solvent. And, in the most preferred embodiment, the at least one solvent and/or the glycol solvent comprises a hydrophobic glycol solvent. In one embodiment, the at least one solvent is in an amount of about 0.1% to about 10%, or more specifically about 4% to about 9%, or even more specifically about 5% to about 8% based on a total weight of the composition. As mentioned, the at least one solvent preferably comprises a hydrophobic glycol solvent. In an embodiment, the at least one solvent is selected from diethylene glycol monoethyl ether, ethylene glycol phenyl ether, ethylene glycol N-hexyl ether, and any combination of any two or more thereof.

In another embodiment, the composition may comprise other exemplary glycol solvents including, but not limited to, glycol ether based solvents based on ethylene or propylene glycol such as ethylene glycol, propylene glycol, diethylene glycol ethyl ether, dipropylene glycol methyl ether, diethylene glycol methyl ether, diethylene glycol propyl ether, diethylene glycol butyl ether, ethylene/diethylene glycol 2-ethylhexyl ether, ethylene glycol phenyl ether, dipropylene glycol propyl ether, dipropylene glycol butyl ether, propylene glycol phenyl ether, and/or blends thereof. The hydrophobic glycol solvents may also include glycol ethers based on benzyl alcohols and/or other similar alcohols.

In another embodiment, other hydrophobic solvents may be used as a substitute to the hydrophobic glycol solvent. Exemplary hydrophobic solvents may include a phthalate-based solvent. Phthalate based solvents may include, but are not limited to, dibutyl phthalate, butyl benzyl phthalate, diethyl phthalate, and/or combinations thereof.

In a preferred embodiment, the at least one solvent, and more particularly the at least one hydrophobic solvent, may provide properties similar to a plasticizer. Further, in a preferred embodiment, the hydrophobic solvents provide minimal to no solid contents to the compositions. As such, the hydrophobic solvent may mimic the properties of a plasticizer, yet may evaporate and, as a result, may not compromise the strength of the composition.

Optionally the solvent system may comprise pyrrolidone based solvents such as 2-pyrrolidone, N-methyl-2-pyrrolidone, N-octyl-2-pyrrolidone, N-dodecyl-2-pyrrolidone, or any other suitable solvent. The solvent system may also optionally include 2,2,4-trimethyl-1,3-pentanediol diisobutyrate.

Waxes

The composition may further include an at least one wax and/or wax emulsion used in combinations herein in amounts ranging from about 1% to about 10%, and more preferably in amounts ranging from about 1% to about 6% based on a total weight of the compositions.

As noted, the composition may further comprise at least one wax or wax emulsion. Suitable waxes include, without limitation, plant, e.g., vegetable, animal, insect, synthetic and/or mineral waxes. Specific examples of suitable waxes include, but are not limited to, candelilla wax, Fisher-Tropsch wax, oxidized petroleum wax, microcrystalline waxes, lanolin wax, wax derived from cocoa butter, cottonseed wax, stearin wax, Japan wax, bayberry wax, myrtle wax, wax derived from mace, palm kernel wax, beeswax, spermaceti, Chinese insect wax, wax made from mutton tallow, polyethylene waxes, oxidized polyethylene waxes, polypropylene waxes, oxidized polypropylene waxes, waxes based on copolymers or propylene and acrylic acid and/or methacrylic acid and/or maleic anhydride, waxes based on copolymers of ethylene and acrylic esters and/or maleic anhydride, waxes based on copolymers of ethylene and acrylic acid and/or methacrylic acid and/or maleic anhydride, waxes based on copolymers of ethylene and styrene and/or other vinyl monomers, waxes obtained from the hydrogenation of coconut oil or soybean oil and mineral waxes such as paraffin, ceresin, montan, ozokerite, and the like.

Water

Water and other solvents may be present in the multi-purpose composition. The compositions herein will typically incorporate water, and more particularly, deionized water, at least about 30% by weight, and most preferably in amounts ranging about 40% to about 50% by weight.

Other Components

The term "additive," as used herein, refers to a compound or substance that may be added to another substance or product for its ability to alter the properties of the other substance or product. For example, an additive may be an emulsifier. The term "emulsifier," as used herein, refers to a substance that stabilizes an emulsion by increasing its kinetic stability. One class of emulsifiers is known as "surface active agents" or surfactants.

The composition may further include at least one surfactant or fluorosurfactant in an amount ranging from about 0.001% to about 5%, and preferably in an amount ranging from about 0.01% to about 2%, and most preferably in an amount ranging from about 0.05% to about 1%. The term "surfactant," as used herein, refers to a chemical compound that lowers the interfacial tension between two liquids. The surfactant may be a nonionic, anionic, cationic, and/or any other type of surfactant. Nonionic surfactants may refer to surfactants where the molecules forming the surfactant are uncharged. Nonionic surfactants may include, but are not limited to, long chain alcohols, such as, for example, fatty alcohols, cetyl alcohol, stearyl alcohol, cetostearyl alcohol (consisting predominantly of cetyl and stearyl alcohols), and oleyl alcohol. Nonionic surfactants may include, but are not limited to, polyoxyethylene glycol alkyl ethers —$CH_3$—$(CH_2)_{10-16}$—$(O$—$C_2H_4)_{1-25}$—OH, such as octaethylene glycol monododecyl ether or pentaethylene glycol monododecyl ether. Nonionic surfactants may also include polyoxypropylene glycol alkyl ethers $CH_3$—$(CH_2)_{10-16}$—$(O$—$C_3H_6)_{1-25}$—OH. Nonionic surfactants may also include glucoside alkyl ethers —$CH_3$—$(CH_2)_{10-16}$—(O-Glucoside)$_{1-3}$-OH, such as decyl glucoside, lauryl glucoside, and octyl glucoside. Nonionic surfactants may further include polyoxyethylene glycol octylphenol ethers —$C_8H_{17}$—$(C_6H_4)$—$(O$—$C_2H_4)_{1-25}$—OH, such as Triton X-100, from Sigma Aldrich. Nonionic surfactants may also include polyoxyethylene glycol alkylphenol ethers —$C_9H_{19}$—$(C_6H_4)$—$(O$—$C_2H_4)_{1-25}$—OH, such as Nonoxynol-9. Nonionic surfactants may further include glycerol alkyl esters such as glyceryl laurate. Nonionic surfactants may also include polyoxyethylene glycol sorbitan alkyl esters (e.g., polysorbate), sorbitan alkyl esters (e.g., spans), cocamide MEA, cocamide DEA, dodecyldimethylamine oxide, block copolymers of polyethylene glycol and polypropylene glycol (e.g., poloxamers), or polyethoxylated tallow amine (e.g., POEA).

Alternatively, anionic surfactants may refer to a surfactant containing an anionic functional group, such as a sulfate, a sulfonate, a phosphate, a carboxylate, or the like. Prominent alkyl sulfates include ammonium lauryl sulfate, sodium lauryl sulfate, sodium dodecyl sulfate (SDS), and the related alkyl-ether sulfates sodium laureth sulfate, also known as sodium lauryl ether sulfate (SLES), and sodium myreth sulfate. Anionic surfactants may also include docusates such as a dioctyl sodium sulfosuccinate, a perfluorooctanesulfonate (PFOS), a perfluorobutanesulfonate, and a linear alkylbenzene sulfonate (LABs). Anionic surfactants may also include alkyl-aryl ether phosphates and an alkyl ether phosphate. Exemplary anionic surfactants may include fluorosurfactants under the brand name Capstone®, such as Capstone® FS-60, Capstone® FS-61, Capstone® FS-64, Capstone® FS-65, Capstone® FS-34, and Capstone® FS-35 available from DuPont™. Anionic surfactants and fluorosurfactants may also be used as an emulsifier with minimal foaming.

The composition may further include an anti-foaming agent or a defoamer in an amount ranging from about 0.001% to about 1% and most preferably in an amount ranging from about 0.001% to about 0.3%. Suitable anti-foaming agents may include, without limitation, insoluble oils, polydimethylsiloxanes emulsions and dispersions and other silicones, certain alcohols, stearates and glycols. Specifically, suitable anti-foaming agents may include Wacker Silfoam® SE-21, SE-24, and SD-168 available from Wacker Chemie AG, BYK® 024 available from BYK, and AGITAN® 786 available from MÜNZING.

The composition may further include a fragrance in an amount ranging from about 0.001% to about 1% and most preferably in an amount ranging from about 0.001% to about 0.01%. The term "fragrance," as used herein, may generally refer to any water soluble fragrance substance or mixture of such substances including those which are naturally derived, for example, obtained by extraction of flower, herb, blossom or plant, those which are artificially derived or produced, for example, a mixture of natural oils and/or oil constituents, and those which are synthetically produced substances, for example, odiferous substances. Suitable fragrances may also include, without limitation, commercially available fragrances.

As previously mentioned, the composition, as disclosed herein, combines a floor finish and a floor sealer into one composition that yields surprising and unexpected results including a high percent elongation in combination with a high tensile strength and, as a result, may provide a relatively soft film with relatively good black heel mark and scuff resistance when compared to other finishes and floor sealers.

FIG. 1 illustrates a graph demonstrating a relationship between a Konig hardness value, i.e., Konig, or a Black Heel/Scuff rating, i.e., BHM/Scuff, and a tensile strength, i.e., Tensile, a percent elongation, i.e., % elongation, a ratio of polymer to resin, i.e., Polymer:resin, a plasticizer to polymer percentage, i.e., Plasticizer, and a hydrophobic solvent to polymer percentage, i.e., Solvent, of multi-purpose floor finish compositions according to an embodiment of the disclosure. From the data reflected in FIG. 1 it was determined that these specific parameters may affect the performance of the multi-purpose floor composition. Specifically, parameters for optimizing the tensile strength, the percent elongation, and/or the black heel mark and/or scuff rating may be a specific ratio, relative weight percentages, and/or relative solid percentages of the polymers, the plasticizers, and the hydrophobic solvents used within the respective composition.

In light of FIG. 1, and further testing described herein, the aforementioned ratios and percentages of components of the composition were optimized to the compositions described herein. Further, a plurality of experiments were performed in order to observe an effectiveness of the compositions and will be discussed in more detail herein.

In a particular embodiment, the composition may have a percent elongation preferably in a range from about 100% to about 140%, and a tensile strength of at least about 1000 psi.

In a particular embodiment, the multi-purpose floor composition is in the form of a ready-to-use product. Therefore, in an another embodiment, a method of finishing and sealing floors may be described and may include contacting the floor with the composition as described herein.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

EXAMPLES

The examples are intended to illustrate certain embodiments of the multi-purpose floor composition to one of ordinary skill in the art and should not be interpreted as limiting in the scope of the disclosure set forth in the claims. The composition may comprise the following non-limiting examples.

Table 1 lists several compositions that were tested to develop the present multi-purpose floor composition. The numerical entries in Table 1 are weight percentages of the specific chemicals in each respective composition, based on the total composition weight. That being said, the following seven compositions, i.e., Compositions 1-7, were produced, as shown below, and subsequently used in relative performance testing as described herein. Further, Table 2 lists the compositions and the specific chemicals used therein as a percent solid. For instance, after application of Composition 2 to a floor, approximately 79.78% of the composition evaporates, leaving approximately 20.22% of the composition on the floor applied thereto. As a result, Composition 2 has a composition solid percent and/or percent solid of 20.22%.

Referring to Table 1, Compositions 1-6 have relatively similar chemical ingredients, but differ with respect to their relative weight percentages. In particular, Compositions 1-6 utilize water, three solvents, i.e., Solvent 1-3, two polymer emulsions, i.e., Polymer Emulsion 1-2, two plasticizers, i.e., Plasticizer 1-2, two wax emulsions, i.e., Wax Emulsion 1-2, a surfactant, an antifoaming agent, and a fragrance. Alternatively, Composition 7 utilizes a third plasticizer, i.e., Plasticizer 3, and an alternative wax emulsion, i.e., Wax Emulsion 3. Further, Composition 7 does not include hydrophobic solvents, i.e., Solvent 2-3, an antifoaming agent, or a fragrance.

As mentioned above, the chemical ingredients can be selected from the components listed and described herein. For instance, Plasticizer 1 may be a benzoate ester, a tributoxy ethyl phosphate, and/or a glycol ether dibenzoates based on ethylene or propylene glycols including, but not limited to, propylene glycol dibenzoate, dipropylene glycol dibenzoate, polypropylene glycol dibenzoate, ethylene glycol dibenzoate, diethylene glycol dibenzoate, polyethylene glycol dibenzoate, neopentyl glycol dibenzoate, and the like, as well as isodecyl benzoate, dipropylene glycol monomethyl ether benzoate, 2,2,4-trimethyl-1,3-pentanediol diisobutyrate, combinations thereof, or any other plasticizer disclosed herein. Therefore, in order to encompass the range of embodiments, the chemical ingredients have been described by general and specific terminology in Tables 1 and 2 and should not be limited to any specific chemical. On that basis, it should be understood that many chemicals, as disclosed herein, may provide the desired properties of the multi-purpose floor finish.

TABLE 1

Composition Weight Percentages

| Chemical Name | 1 | 2 | 3 | 4 | 5 | 6 | 7 |
| --- | --- | --- | --- | --- | --- | --- | --- |
| Water | 44.75 | 43.193 | 47.119 | 40.783 | 49.037 | 47.109 | 46.239 |
| Solvent 1 (diethylene glycol ethyl ether (DE carbitol)) | 5.62 | 5.62 | 5.62 | 5.26 | 5.62 | 5.62 | 4.56 |
| Plasticizer 1 (tributoxyethyl phosphate (KP-140)) | 1.25 | 0.825 | 2.57 | 0.825 | 2.571 | 2.57 | 1.25 |
| Plasticizer 2 (Benzoflex ™ 2088) | 1.75 | 0.825 | 2.57 | 0.825 | 2.571 | 2.57 | 1.32 |
| Plasticizer 3 (Eastman TXIB - CAS No. 6846-50-0) | — | — | — | — | — | — | 1.15 |
| Surfactant (Capstone ® FS-60) | 0.05 | 0.05 | 0.05 | 0.05 | 0.05 | 0.05 | 0.90 |
| Polymer Emulsion 1 (RHOPLEX ™ E-3392) | 38.089 | 39.079 | 30.737 | 42.105 | 33.158 | 33.158 | 34.93 |
| Polymer Emulsion 2 (RHOPLEX ™ 1531) | 1.316 | 3.908 | 3.074 | 0.842 | 0.663 | 0.663 | 2.26 |
| Wax Emulsion 1 (E-43 maleated polypropylene wax (Michem 94340)) | 1.875 | 1.875 | 1.875 | 1.875 | 1.875 | 1.875 | 2.53 |
| Wax Emulsion 2 (AC-316 high density polyethylene wax emulsion - MorFlo-WE30)) | 3.60 | 3.60 | 3.60 | 3.60 | 3.60 | 3.60 | — |
| Wax Emulsion 3 (AC-325 high density polyethylene wax emulsion (Michem 93235)) | — | — | — | — | — | — | 4.86 |
| Solvent 2 (ethylene glycol phenyl ether (Dowanol EPH)) | 0.8 | 0.41 | 1.29 | 1.635 | 0.325 | 1.29 | — |
| Solvent 3 (ethylene glycol hexyl ether (Hexyl Cellosolv)) | 0.7 | 0.41 | 1.29 | 1.635 | 0.325 | 1.29 | — |
| Antifoam (BYK ® 024) | 0.005 | 0.005 | 0.005 | 0.005 | 0.005 | 0.005 | — |
| Fragrance (Takasago RTA-006108) | 0.2 | 0.2 | 0.2 | 0.2 | 0.2 | 0.2 | — |

TABLE 2

Composition Solid Percentages

| Chemical Name | 1 | 2 | 3 | 4 | 5 | 6 | 7 |
|---|---|---|---|---|---|---|---|
| Water | 0.00 | 0.00 | 0.00 | 0.00 | 0.00 | 0.00 | 0.00 |
| Solvent 1 (diethylene glycol ethyl ether (DE carbitol)) | 0.00 | 0.00 | 0.00 | 0.00 | 0.00 | 0.00 | 0.00 |
| Plasticizer 1 (tributoxyethyl phosphate (KP-140)) | 1.25 | 0.825 | 2.57 | 0.825 | 2.571 | 2.57 | 1.25 |
| Plasticizer 2 (Benzoflex ™ 2088) | 1.75 | 0.825 | 2.57 | 0.825 | 2.571 | 2.57 | 1.32 |
| Plasticizer 3 (Eastman TXIB - CAS No. 6846-50-0) | — | — | — | — | — | — | 1.15 |
| Surfactant (Capstone ® FS-60) | 0.02 | 0.02 | 0.02 | 0.02 | 0.02 | 0.02 | 0.009 |
| Polymer Emulsion 1 (RHOPLEX ™ E-3392) | 14.474 | 14.85 | 11.68 | 16.0 | 12.60 | 12.60 | 13.2735 |
| Polymer Emulsion 2 (RHOPLEX ™ 1531) | 0.50 | 1.485 | 1.168 | 0.32 | 0.252 | 0.252 | 0.8589 |
| Wax Emulsion 1 (E-43 maleated polypropylene wax (Michem 94340)) | 0.75 | 0.75 | 0.75 | 0.75 | 0.75 | 0.75 | 1.012 |
| Wax Emulsion 2 (AC-316 high density polyethylene wax emulsion - MorFlo-WE30)) | 1.26 | 1.26 | 1.26 | 1.26 | 1.26 | 1.26 | — |
| Wax Emulsion 3 (AC-325 high density polyethylene wax emulsion (Michem 93235)) | — | — | — | — | — | — | 1.701 |
| Solvent 2 (ethylene glycol phenyl ether (Dowanol EPH)) | 0.00 | 0.00 | 0.00 | 0.00 | 0.00 | 0.00 | 0.00 |
| Solvent 3 (ethylene glycol hexyl ether (Hexyl Cellosolv)) | 0.00 | 0.00 | 0.00 | 0.00 | 0.00 | 0.00 | 0.00 |
| Antifoam (BYK ® 024) | 0.0048 | 0.0048 | 0.0048 | 0.0048 | 0.0048 | 0.0048 | 0.0048 |
| Fragrance (Takasago RTA-006108) | 0.20 | 0.20 | 0.20 | 0.20 | 0.20 | 0.20 | 0.00 |
| Total | 20.21 | 20.22 | 20.22 | 20.20 | 20.22 | 20.22 | 20.57 |
| Total w/o Fragrance | 20.009 | 20.02 | 20.018 | 20.00 | 20.024 | 20.022 | 20.57 |

Tables 3 and 4 list measured properties of the aforementioned compositions. The numerical entries in Tables 3 and 4 correlate to relative percentages, ratios, or proportions of particular chemicals in the respective composition. For instance, hydrophobic solvent on polymer solids for Composition 2 may be calculated by dividing the sum of the hydrophobic solvents, i.e., 0.82%, by the sum of the polymer emulsions, i.e., 16.335%, and multiplying by 100. The plasticizer on polymer solids percentage may be calculated by dividing the sum of the plasticizer solids, i.e., 1.65%, by the sum of the polymer emulsions, i.e., 16.335%, and multiplying by 100. Further, in the present embodiments, Polymer Emulsion 2 is an alkali-soluble resin. As a result, the polymer:resin ratio for Composition 2 may be calculated by dividing the Polymer 1 solid percentage, i.e., 14.85%, by the Polymer 2 solid percentage, i.e., 1.485%. Additionally, it should be noted that the total w/o fragrance value, as shown in Table 2, was used to calculate the properties in relation to the total solids, i.e., plasticizer on total solids and Polymer 2 on total solids.

Further, as noted previously, the at least one polymer, the at least one plasticizer, the at least one hydrophobic solvent, and their compositions relative to each other was integral in developing a coating composition with the desired properties of both a floor finish and a floor sealer. With that in mind, the polymer:resin ratio, plasticizer on polymer percentage, and the hydrophobic solvent on polymer percentage properties were determined to be directly relevant to a tensile strength, a percent elongation, and a durability of the multipurpose floor composition. As such, Table 4 is a condensed version of Table 3 listing these particular properties for comparison and ease.

For one, polymers may provide necessary flexibility to a composition, while a resin may provide a desired strength. Hence, the polymer:resin ratio provides a comparison between the flexibility and the strength of a composition. Further, plasticizers may increase the plasticity or fluidity of a material. As a result, a relatively high level of plasticizer may create softer and weaker films. However, a lack of a plasticizer may produce a brittle composition. Therefore, the plasticizer to polymer percentage may provide an indication of an optimal amount of plasticizer. Last, as previously mentioned, hydrophobic solvents may provide properties similar to a plasticizer during application, but may leave the solution as a volatile and may not contribute to the solid percentage. Thus, hydrophobic solvents may mimic a plasticizer during application, yet not compromise the tensile strength of the composition after drying.

TABLE 3

Composition Properties

| Chemical Properties | 1 | 2 | 3 | 4 | 5 | 6 | 7 |
|---|---|---|---|---|---|---|---|
| Solvent on Polymer Solids (%) | 37.53 | 34.40 | 43.74 | 34.44 | 43.73 | 43.73 | 32.27 |
| Hydrophobic Solvent on Polymer Solids (%) | 10.02 | 5.02 | 20.08 | 20.04 | 5.06 | 20.07 | 0.00 |
| Plasticizer on Total Solids (%) | 14.99 | 8.24 | 25.68 | 8.25 | 25.68 | 25.67 | 18.19 |

TABLE 3-continued

| Composition Properties | | | | | | | |
|---|---|---|---|---|---|---|---|
| Chemical Properties | 1 | 2 | 3 | 4 | 5 | 6 | 7 |
| Plasticizer on Polymer Solids (%) | 20.03 | 10.10 | 40.01 | 10.11 | 40.01 | 39.99 | 26.32 |
| Wax on Polymer Solids (%) | 10.05 | 10.04 | 10.04 | 10.05 | 10.04 | 10.04 | 13.19 |
| Polymer: Resin | 30.00 | 10.00 | 10.00 | 50.00 | 50.00 | 50.00 | 15.454 |
| Fluorochemical level total (ppm) | 200 | 200 | 200 | 200 | 200 | 200 | 90 |
| Fluorochemical level total (FC only) (ppm) | 125 | 125 | 125 | 125 | 125 | 125 | 56.25 |
| Polymer 2 on Total Solids (%) | 2.50 | 7.42 | 5.83 | 1.60 | 1.26 | 1.26 | 4.17 |

TABLE 4

| Experiment | Polymer: Resin | Plasticizer on Polymer (%) | Hydrophobic Solvent on Polymer (%) |
|---|---|---|---|
| Composition 1 | 30 | 20 | 10 |
| Composition 2 | 10 | 10 | 5 |
| Composition 3 | 10 | 40 | 20 |
| Composition 4 | 50 | 10 | 20 |
| Composition 5 | 50 | 40 | 5 |
| Composition 6 | 50 | 40 | 20 |
| Composition 7 | 16 | 26 | 0 |

Testing

The compositions of Table 1 were subjected to testing as follows. First, a percent elongation, a tensile strength, and a thickness was measured for each composition by methods known in the art. For instance, in this particular embodiment, 300 ml of each composition was evenly distributed on a 13"×13" pan and cured for one week in ambient conditions followed by approximately 12 hours in an oven at 120° F. Following application, each composition was subjected to testing using Instron® testing data and/or ASTM International testing methods to determine a percent elongation and a tensile strength for each composition. Specifically, a standard test method for tensile properties of plastics under ASTM International designation number D 638-03 was used, the entirety of which is incorporated by reference herein.

In addition, a hardness test was performed on each composition to determine a Konig value for the composition tested. During these measurements, 1 ml of each composition was subjected to Konig testing 16 days after application of the composition.

Then, a durability test was performed to determine a BHM, i.e., Black Heel Mark, or scuff resistance. In this instance, a Snell Capsule test, as understood in the art, was performed. During this particular durability test, white vinyl composition tiles ("VCT") were given a four hour cure with four coats of the composition tested and subjected to 50 cycles at 60 rpm inside a Snell Capsule, i.e., a tumbling rotation device. The Snell Capsule may include a plurality of black rubber cubes located therein that act to stimulate foot traffic. After testing, each tile was assigned a rating number comparative to a standard and indicative to the presence of markings on the VCT. For example, a rating of 10 corresponds to no observable black heel marking and/or scuffing. In contrast, a rating of 3 or less indicated poor resistance to black heel marking and/or scuffing and low durability.

Compositions 1-7 were compared to known floor sealers and floor finishes of the prior art, such as Signature® Ultra High Speed Floor Finish from Sealed Air, i.e., Example S, Vectra® Floor Finish from Sealed Air, i.e., Example V, JonCrete$^{TM/MC}$ Matte Concrete Sealer from Sealed Air, i.e., Example J, ISHINE from Spartan®, i.e., Example I, Vinyl Protector from 3M™, i.e., Example V, Hybrid® from Betco®, i.e., Example H, and Castleguard® from Buckeye®, i.e., Example C. Table 5 lists the measured percent elongation, the tensile strength, the Konig value, the BHM/Scuff Rating, and the thickness of Compositions 1-7 and the commercially available prior art compositions. As mentioned, the percent elongation quantifies the flexibility of a composition, while the tensile strength may represent the strength or durability of a composition. The optimal composition may exhibit a percent elongation and a tensile strength that may provide a composition that is strong and durable enough to withstand BHM or scuff markings, yet flexible enough for reparability, i.e., an ability of a film to respond to buffering, burnishing, etc. by releasing Black Heel marks, scuffs, and/or improving gloss. As shown in Table 5, commercially available floor finishes, e.g., Example S and Example V, have relatively high tensile strengths and relatively high BHM and scuff ratings. However, the prior art floor finishes have inadequate percent elongation values, making them brittle. Alternatively, the commercially available floor sealers, e.g., Example J, provides a composition with a relatively high percent elongation, yet an insufficient tensile strength and BHM/scuff rating.

Further, some compositions were subjected to a plurality of tests. As a result, some compositions include a range for certain values, e.g., Composition 1 and Example S, therefore representing a minimum and a maximum measured value.

TABLE 5

| Composition | Percent Elongation | Tensile (psi) | Konig ($s^{-1}$) | BHM/Scuff Rating | Thickness (inches) |
|---|---|---|---|---|---|
| Prior Art Example S | 85.00-92.00 | 1152.66 | 40 | 7 | 0.023 |
| Prior Art Example V | 47.00-63.00 | 860.46 | 65 | 10 | 0.025 |
| Prior Art Example J | 146.00-160.00 | 160.32 | 26 | 1 | 0.030 |
| Prior Art Example I | 69.00 | 1065.00 | 51 | 10 | 0.015 |
| Prior Art Example V | 6.00 | 1007.00 | 54 | 6 | 0.024 |
| Prior Art Example H | 91.00 | 975.00 | 36 | 6 | 0.021 |
| Prior Art Example C | 108.00 | 618.00 | 58 | 5 | 0.033 |
| Composition 1 | 100.00-140.00 | 1074.18-1143.00 | 36 | 10 | 0.020-0.030 |

TABLE 5-continued

| Composition | Percent Elongation | Tensile (psi) | Konig ($s^{-1}$) | BHM/Scuff Rating | Thickness (inches) |
|---|---|---|---|---|---|
| Composition 2 | 1.50 | 320.00 | 80 | 10 | 0.030 |
| Composition 3 | 170.00 | 609.00 | 10 | 6 | 0.030 |
| Composition 4 | 47.00 | 964.00 | 81 | 10 | 0.023 |
| Composition 5 | 153.00 | 782.49 | 10 | 7 | 0.025 |
| Composition 6 | 189.00 | 556.81 | 10 | 5 | 0.028 |
| Composition 7 | 68.00 | 1134.79 | 33 | 10 | 0.026 |

Preferred Embodiment

As mentioned, FIG. 1 illustrates the relationships between the Konig hardness value or the BHM and scuff rating, and the tensile strength, percent elongation, the polymer:resin ratio, the plasticizer on polymer solids percentage, and the hydrophobic solvent on polymer solids percentage. As shown in FIG. 1, the Konig hardness value had a relatively negative, but moderately small, correlation to the tensile strength. For that reason, the Konig hardness value was determined to be insufficient in providing a relative durability or strength of a composition. In addition, and as a result of the moderately small correlation discovered, it was determined that the desired Konig values, i.e., low Konig values, were still able to be observed at high tensile strengths and/or desirable BHM/Scuff ratings.

An optimal BHM/Scuff rating was determined to be approximately 9.89, with a tensile strength of at least about 1000 psi, and a percent elongation of at least about 70% and most preferably of at least about 100%. In order to achieve optimal results, the polymer:resin ratio may approximately range between about 25 to about 35, the plasticizer on polymer solids percentage may range from about 20% to about 25%, and the hydrophobic solvent on polymer solids percentage may range from about 7% to about 12%. In the preferred embodiment, the polymer:resin ratio is approximately 30, the plasticizer on polymer solids percentage is approximately 20%, and the hydrophobic solvent on polymer solids percentage is approximately 10%. For that reason, Composition 1 provides a preferred embodiment of the multi-purpose floor composition.

As noted previously, it will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

We claim:

1. A composition for use as a multi-purpose floor coating, that when applied to a floor, comprises:
an at least one polymer having a solids content between about 11% and about 30%, based on a total weight of the composition;
an at least one resin having a solids content, based on a total weight of the composition;
an at least one plasticizer having a solids content, based a total weight of the composition;
a percent elongation of at least 100%; and
a tensile strength of at least 1000 psi,
wherein the solids content of the at least one plasticizer to the solids content of the at least one polymer is between about 20% and about 25%,
wherein the solids content of the at least one polymer and the solids content of the at least one resin are in a ratio of about 25:1 to about 35:1, and
wherein the composition has a solids content of about 15% to about 25%, by weight of the composition.

2. The composition of claim 1, wherein the composition further comprises a Konig value lower than 50 $s^{-1}$.

3. The composition of claim 1, wherein the composition finishes and seals floors in a single ready-to-use product.

4. A composition for use as a multi-purpose floor finish, the composition comprising:
an at least one polymer;
an at least one resin;
an at least one plasticizer; and
an at least one hydrophobic solvent,
wherein total hydrophobic solvent in the composition has a weight percentage, based on a total weight of the composition, the at least one resin has a solids content, based on a total weight of the composition, the at least one plasticizer has a solids content, based on a total weight of the composition, and the at least one polymer has a solids content between 11% and 30%, based on a total weight of the composition,
wherein the solids content of the at least one plasticizer to the solids content of the at least one polymer is between 20% and 25%,
wherein the solids content of the at least one polymer and the solids content of the at least one resin are in a ratio of 25:1 to 35:1, and
wherein the weight percentage of the total hydrophobic solvent to the solids content of the at least one polymer is between 7% and 12% wherein the composition has a percent elongation of at least 100% and a tensile strength of at least 1000 psi.

5. The composition of claim 4, wherein the at least one polymer comprises an acrylic polymer emulsion.

6. The composition of claim 5, wherein the acrylic polymer emulsion comprises a styrene.

7. The composition of claim 4, wherein the at least one polymer is in an amount of about 30 wt. % to about 40 wt. %.

8. The composition of claim 7, wherein the at least one polymer and the at least one resin further comprises an alkali soluble polymer and/or resin solution.

9. The composition of claim 8, wherein an acrylic polymer emulsion and the alkali soluble polymer and/or resin solution are in a ratio of about 25:1 to about 35:1, by weight.

10. The composition of claim 4, wherein the solids content of the at least one plasticizer is about 0.5% to about 3% of a total weight of the composition.

11. The composition of claim 4, wherein the solids content of the at least one polymer is about 11 wt. % to about 16 wt. % of a total weight of the composition.

12. A composition for a multi-purpose floor finish that finishes and seals floors, the composition comprising:
- an at least one acrylic polymer emulsion;
- an at least one alkali soluble polymer and/or resin solution;
- an at least one benzoate ester plasticizer; and
- an at least one glycol solvent that comprises at least one hydrophobic glycol solvent,
- wherein a weight percent of the at least one acrylic polymer emulsion, based on a total weight of the composition, and a weight percent of the at least one alkali soluble polymer and/or resin solution, based on a total weight of the composition, are in a ratio of about 25:1 to about 35:1,
- wherein a weight percentage of total hydrophobic glycol solvent, based on a total weight of the composition, to a solids content of the at least one acrylic polymer, based on a total weight of the composition, is between 7% and 12%, and
- wherein the solids content of the at least one acrylic polymer is between about 11% and about 30% wherein the composition has a percent elongation of at least 100% and a tensile strength of at least 1000 psi.

13. The composition of claim 12, wherein the composition further comprises an at least one wax, an at least one surfactant, and a fragrance.

14. The composition of claim 13, wherein the at least one acrylic polymer emulsion is in an amount of about 30 wt. % to about 40 wt. % based on a total weight of the composition; the at least one alkali soluble polymer and/or resin solution is in an amount of about 1 wt. % to about 4 wt. % based on a total weight of the composition; the at least one benzoate ester plasticizer is in an amount of about 1 wt. % to about 3 wt. % based on the total weight of the composition; the at least one glycol solvent is in an amount of about 5 wt. % to about 8 wt. % based on the total weight of the composition; the at least one wax is in an amount of about 1 wt. % to about 6 wt. % based on the total weight of the composition; and the at least one surfactant is in an amount of about 0.01 wt. % to about 0.1 wt. % based on the total weight of the composition.

15. The composition of claim 12, wherein the at least one glycol solvent is selected from the group consisting of diethylene glycol monoethyl ether, ethylene glycol phenyl ether, ethylene glycol N-hexyl ether, and a combination of any two or more thereof.

16. The composition of claim 12, wherein the at least one hydrophobic glycol solvent comprises an ethylene glycol phenyl ether and an ethylene glycol hexyl ether.

17. The composition of claim 12, wherein the at least one benzoate ester plasticizer has a solids content, based on a total weight of the composition, and wherein the solids content of the at least one acrylic polymer emulsion to the solids content of the at least one benzoate ester plasticizer is about 20% to about 25%.

* * * * *